United States Patent [19]

Goyer

[11] 3,887,916
[45] June 3, 1975

[54] CORRELATOR AND CONTROL SYSTEM FOR VEHICULAR COLLISION AVOIDANCE

[75] Inventor: Ronald Bruce Goyer, North Hollywood, Calif.

[73] Assignee: RCA Corporation, New York, N.Y.

[22] Filed: Apr. 30, 1973

[21] Appl. No.: 355,448

[30] Foreign Application Priority Data

| June 27, 1972 | United Kingdom | 30036/72 |
| Jan. 18, 1973 | United Kingdom | 2634/73 |
| June 27, 1972 | United Kingdom | 30039/72 |
| Apr. 13, 1973 | United Kingdom | 30036/73 |

[52] U.S. Cl. .................................. 343/6.5 LC
[51] Int. Cl. ...................................... G01s 9/56
[58] Field of Search ................ 343/6.5 R, 6.5 LC

[56] References Cited
UNITED STATES PATENTS

| 3,108,275 | 10/1963 | Chisholm | 343/6.5 R X |
| 3,153,232 | 10/1964 | Fletcher et al. | 343/6.5 LC X |
| 3,312,970 | 4/1967 | Bond | 343/6.5 R X |
| 3,594,799 | 7/1971 | Michnik | 343/6.5 LC |
| 3,611,379 | 10/1971 | Deckett | 343/6.5 LC X |
| 3,755,811 | 8/1973 | Breckman | 343/6.5 R |

*Primary Examiner*—Malcolm F. Hubler
*Attorney, Agent, or Firm*—Edward J. Norton; Joseph D. Lazar

[57] ABSTRACT

A system for controlling the transmission of randomly asynchronous probe signals and "defruiting" received reply signals from remote aircraft through code division multiplex using both a random coded frequency hopping signal and a random coded repetition rate or PFR. The reply signals are correlated and accumulated by a logic circuit such that only replies of an aircraft within a predetermined range will be designated by an appropriate control signal.

10 Claims, 10 Drawing Figures

PROBE RETURN

| SEND | P | P | Q | P | Q | P | P | Q | P | P | Q | P | ACCUMULATOR OR INTEGRATOR OUTPUT |
|---|---|---|---|---|---|---|---|---|---|---|---|---|---|
| DESIRED RETURN | P | P | Q | P | Q | P | P | Q | P | P | Q | P | |
| CORRELATOR OUTPUT | +1 | +1 | +1 | +1 | +1 | +1 | +1 | +1 | +1 | +1 | +1 | +1 | = 12 (FOR A NET OF 12 LIKE CORRELATIONS) |

*Fig. 4*

FRUIT

| SEND | P | P | Q | P | Q | P | P | Q | P | P | Q | P | ACCUMULATOR OR INTEGRATOR OUTPUT |
|---|---|---|---|---|---|---|---|---|---|---|---|---|---|
| RANDOM RETURN | P | Q | P | P | Q | Q | P | Q | Q | Q | P | Q | |
| CORRELATOR OUTPUT | +1 | -1 | -1 | +1 | +1 | -1 | +1 | +1 | -1 | -1 | -1 | -1 | = -2 (FOR A NET OF 2 UNLIKE CORRELATIONS) |

GENERATION OF P & Q - PROBE COMMANDS

Fig. 8
GENERATION OF BIN-TIME CONTROL PULSES

Fig. 9

TYPICAL STEPPING SEQUENCE
TO PROVIDE OVERLAP
TO PREVENT TARGET MISS 3,887,916

CORRELATOR AND CONTROL SYSTEM FOR VEHICULAR COLLISION AVOIDANCE

CROSS REFERENCE TO RELATED APPLICATIONS

Of interest are the following copending patent applications Ser. No. 735,716, filed June 10, 1968, entitled "Discriminating Signal System," now U.S. Pat. No. 3,755,811 and Ser. No. 27,403, filed Apr. 10, 1970, entitled "Separation Control of Aircraft by Non-Synchronous Techniques," now U.S. Pat. No. 3,803,608 both based on the inventions of Jack Breckman, also patent applications respectively filed on July 7, 1972, entitled "Digital Range Rate Computer" Ser. No. 269,535 based on the invention of Bernard Case and Jeffrey Ellis Miller, now U.S. Pat. No. 3,803,602 "Track Gate Movement Limiter," Ser. No. 269,538 based on the invention of Bernard Case and Jeffrey Ellis Miller, now U.S. Pat. No. 3,803,605 and "Digital Tracker," Ser. No. 269,536, on the invention of Bernard Case; now U.S. Pat. No. 3,803,604 also, patent applications filed on even date herewith entitled "Wide Range Monostable Multivibrator Circuit" Ser. No. 355,445 and "Digital Interface Circuit for a Random Noise Generator" now U.S. Pat. No. 3,816,765, based on the inventions of Ronald Bruce Goyer, all of which patent applications and patents being assigned to the same assignee as the assignee of the patent application.

BACKGROUND OF THE INVENTION

1. Field of the Invention

This invention relates to a correlator and control circuit for a vehicle to process signals useful in a vehicular collision avoidance system, more particularly, of the SECANT type for aircraft.

2. Description of the Prior Art

The present invention is concerned with improvements to and extensions of the signaling system disclosed and claimed in the above identified copending patent applications relating to the basic principles of SECANT which is a signaling system for avoiding mid-air collisions between aircraft.

Correlation techniques for analogue and digital signal formats are well known and have been used extensively in many different arts. In the art of vehicular collision avoidance the processing of signals corresponding to positions of vehicles moving at widely varying speeds is a difficult task when accuracy on a real-time basis is essential. Various proposals have been made heretofore based on synchronous techniques wherein the vehicles process signals referred to a precisely timed synchronous source. Cooperation between vehicles in such prior systems depend on cooperative fixed position stations such as ground stations when the vehicles are aircraft. A collision avoidance system based on a non-synchronous relation between vehicles utilizing digital techniques for correlation and identification of signals corresponding to vehicles that may collide is needed.

SUMMARY OF THE INVENTION

The present invention provides for a correlator control circuit for vehicular collision including means for generating random coded probe or interrogator signals for periodic transmission to the environment, each probe signal having either one of two characteristic indicia. Remote vehicles in the environment transmit their own such random coded probe signals as well as replies to probe signals from all other vehicles in the environment. The indicia of the reply signals correspond to the indicia of the probe signals. Receivers on the vehicles include digital circuit means for discriminating the received signals into either of the two indicia interrogation signals, and in synchronism with the periodic probe transmission, compare the transmitted and received signals to determine and integrate the correlation of like and unlike relationship of the signals.

DESCRIPTION OF A PREFERRED EMBODIMENT

The system described herein is an embodiment of the invention useful in a collision avoidance system for aircraft particularly the SECANT-type which is described in detail in the above identified copending applications. Other uses of the correlator and control system include collision avoidance systems for vehicular forms such as maritime surface vessels for inland, coastal and open-sea applications.

Figure 1:
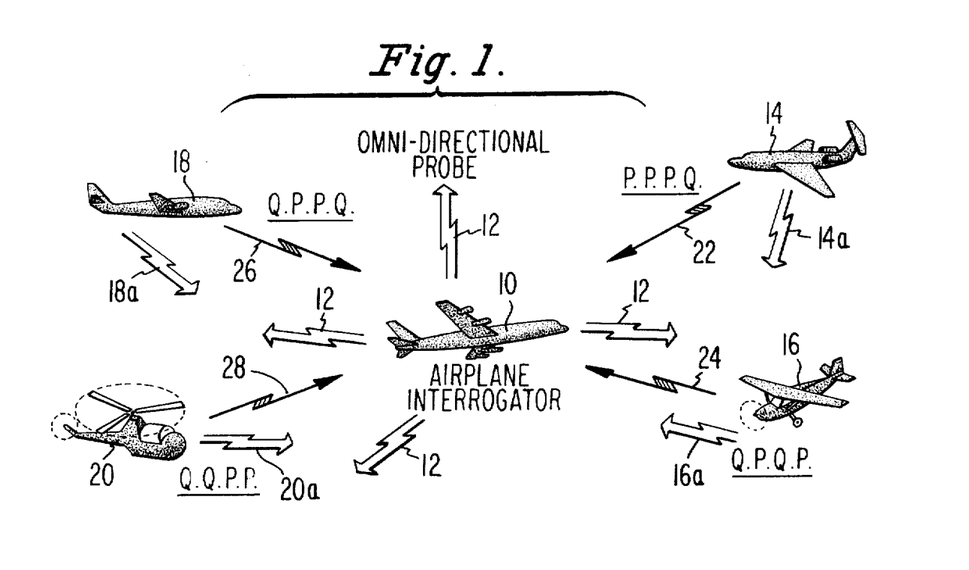
FIG. 1 is a diagram illustrating a group of aircraft in the vicinity of an interrogating aircraft and of the various P and Q signals that are being transmitted and replied.

Reference is now made to FIG. 1 of the drawing showing the application of the correlator and control system in a collision avoidance system of the SECANT type in the environment of several aircraft. An interrogator station 10 transmits probes 12 comprising pulses of one microsecond duration every millisecond with a random coded frequency hopping signal and a random coded repetition rate or PRF. Being purely random, the sequences are unique to all aircraft. As will be explained, approximately one hundred responses are correlated and integrated in 0.1 seconds (100 milliseconds) manifesting an extremely high probability of detection and an extremely low probability of false alarm.

The frequency hopping code uses two frequencies selected from those allocated by, for example, the U.S. Federal Communications Commission's frequency spectrum available for aircraft communication purposes, designated for the SECANT system as P and Q frequency signals. Each P and Q signal is a one microsecond pulse at a nominal but variably random rate of 1000 pulses per second. A transponder provided in each aircraft replies to every received pulse at another but corresponding P or Q frequency. Each of the aircraft probes with its own unique sequence of randomly generated P's and Q's and receives a reply to such probes that is related directed to its individual sequence.

Thus, as illustrated in FIG. 1, aircraft 10 transmits omni-directional signals as indicated by probes 12. The several aircraft 14, 16, 18, and 20 within the capable range of the system, which may extend a distance in the order of up to 80 miles, are each provided with transponder equipment including means for receiving the probes 12 and generating reply signals corresponding in kind to the respective P and Q signals such as indicated by the signal groups 22, 24, 26, and 28 from the respective aircraft. It is noted that during this time but also on an asynchronous system basis each of the aircraft is transmitting their own probes 14a, 16a, 18a, and 20a. Thus, aircraft 10 will transpond replies to the other aircrafts 14, 16, 18, and 20 probes (not shown) as well as each of the other aircraft transponding replies to each other's probes. Further, aircraft 14 will transpond a reply to probes from aircrafts 16, 18, and 20 as well as the probes from aircraft 10. As more and more aircraft appear in the range environment, it will be appreciated, thus, that the problem of identifying aircrafts for the purpose of avoiding collision is severe.

Referring to FIGS. 2, 3, 4, and 5, there is illustrated in schematic form the manner in which signal probes and replies are processed by the correlator and control system of the invention.

Figure 2:
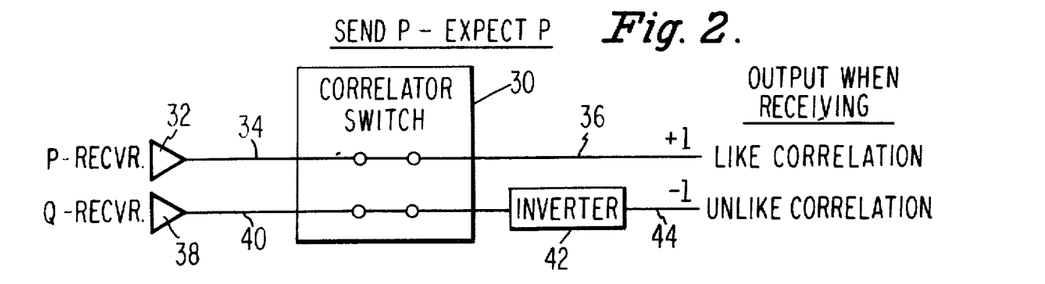
FIGS. 2 and 3 are schematics illustrating the function of the correlator switch for processing the probe and return signals.

FIG. 2 represents the condition of the system during the time period a signal pulse P is transmitted at one frequency from interrogator aircraft 10, expecting a reply signal P at a different frequency to indicate that an aircraft in the vicinity is responding to the interrogation probe. Thus, when a P pulse is transmitted expecting a P reply, a switch 30 in the correlator control circuit is gated or operated in the horizontal direction shown. P pulse replies received by the receiver 32 tuned to the frequency of the received P signal are passed through switch 30 from input path 34 to output path 36 and are integrated in the system as a "like" correlation or a +1 pulse. This "like" correlation in the SECANT system has been termed a "hit." Q reply pulses, during this same time period, are not expected and are thus defined as "fruit." Q signals received from aircraft in the vicinity are received at receiver 38, tuned to the Q frequency, and passed through switch 30 over path 40 through inverter 42 whose output is designated as an "unlike" correlation or as a −1 pulse, which, as will be explained, when integrated in the correlator serves to negate the "like" correlation or positive (+) pulse replies. It is to be noted that the inverted 42 is an analog type inverter and is included in FIGS. 2 and 3 only for illustrative purposes to establish the minus sign associated with the numerical unit value (−1) of this output. The preferred form of the system according to the invention does not require or use such an inverter, as will be described. It should be understood that some of the fruit replies may also be in the P frequency domain generating thereby +1 pulses. "Fruit" replies occur when the other aircraft 14, 16, 18, and 20 are transponding replies to the probes from these other aircraft 14, 16, 18, and 20. These replies are not of interest to the interrogator aircraft 10 but these replies may exist. The system operation will satisfactorily process the fruit replies along with the expected replies. Such fruit has a 50—50 probability of being either a P or Q reply pulse. Thus, fruit pulses that are added positively in the upper switch path 34–36 are approximately equal to those that are added negatively in the lower channel 40–44 of switch 30. This results in approximate cancellation of the fruit, leaving only a net positive result from correlated replies.

Figure 3:
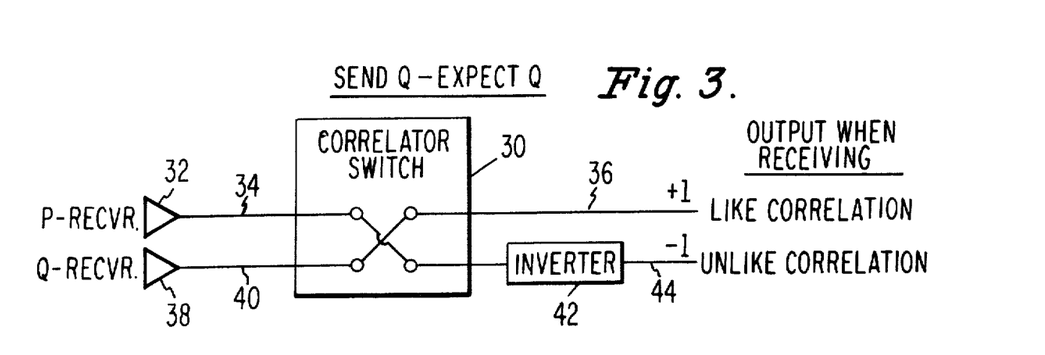

Similarly whenever a Q frequency interrogation pulse is transmitted as illustrated in FIG. 3 and a Q reply pulse is expected in the correlator, the correlator switch 30 is operated in the position as shown in the drawing FIG. 3 so that the respective receiver paths are reversed. Thus, the P pulses from receiver 32 are inverted down through inverter 42 to result in a negative pulse while the Q pulses from receiver 38 are applied as an output pulse over path 36. Thus, path 36 always has like correlation signals on it while path 44 always has unlike correlation signals on it.

Figure 4:
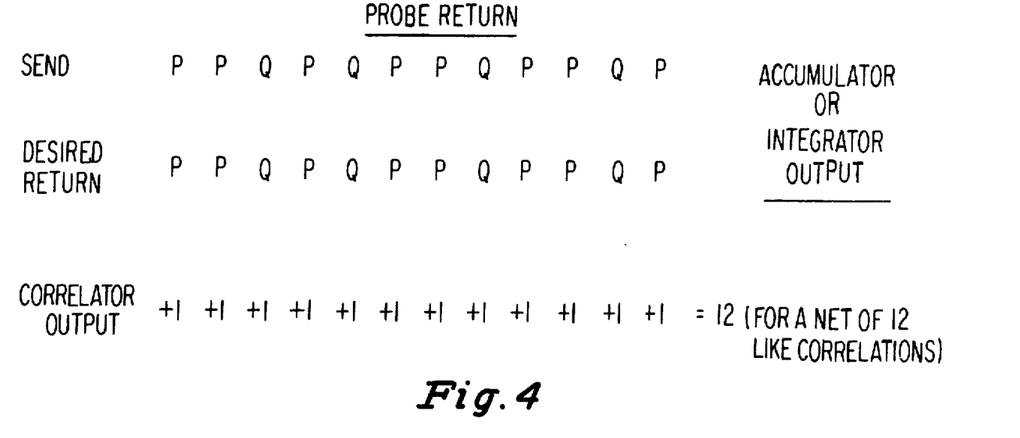
FIGS. 4 and 5 are charts illustrating a typical sample of probe returns and fruit returns
Figure 5:
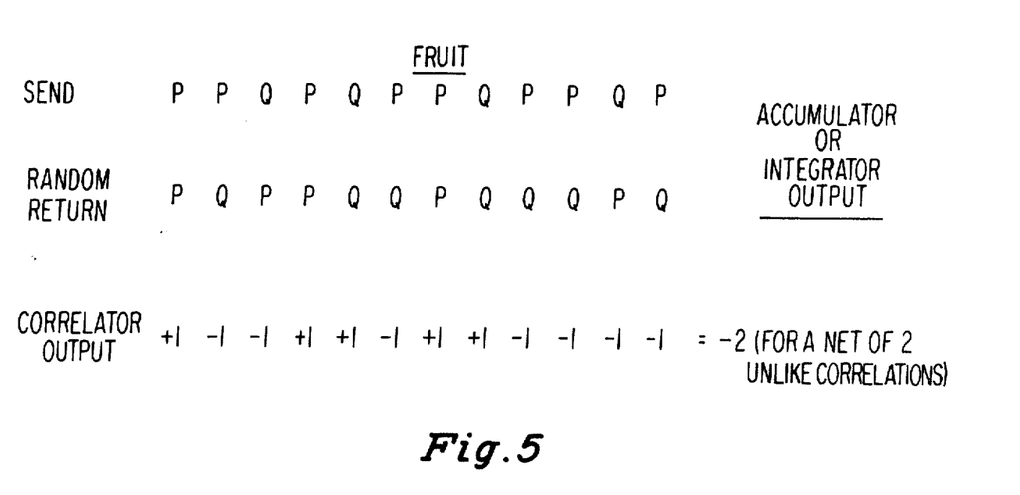

An illustration of a group of probe returns and fruit is illustrated in FIGS. 4 and 5. In FIG. 4, there is shown in the "SEND" row 12 pulses in a random sequence of P's and Q's with the "desired return" of pulses corresponding thereto in the following row. Each of these "send" and "desired returns," thus, produce a +1 pulse developed by the switching operation, illustrated in FIGS. 2 and 3, resulting in a net of 12 pulses or 12 like correlation due to true replies or "hits," indicated at the integrator output as 12 (FIG. 4). During the same probe period, fruit that is received is completely random as indicated by the random return row in FIG. 5. Thus, a random return that is the same as the transmitted signal during the probe period the correlator switch is so-positioned will develop a positive signal at the correlator output, while dissimilar signals will produce negative pulses. In the illustration as shown in FIG. 5, the integrator output is −2 or just 2 unlike correlations. The value of −2 it will be appreciated, is substantially near zero which is the statistical average of fruit expected. This value is significantly different from the net positive value of 12 shown in FIG. 4 indicating true returns, or hits. In practice, a SECANT cycle integrating 100 hits and fruit pulses will make the relative ratio of the fruit and hits substantially greater than the ratio of 12:2 of the illustrations shown in FIGS. 4 and 5.

Figure 6A:
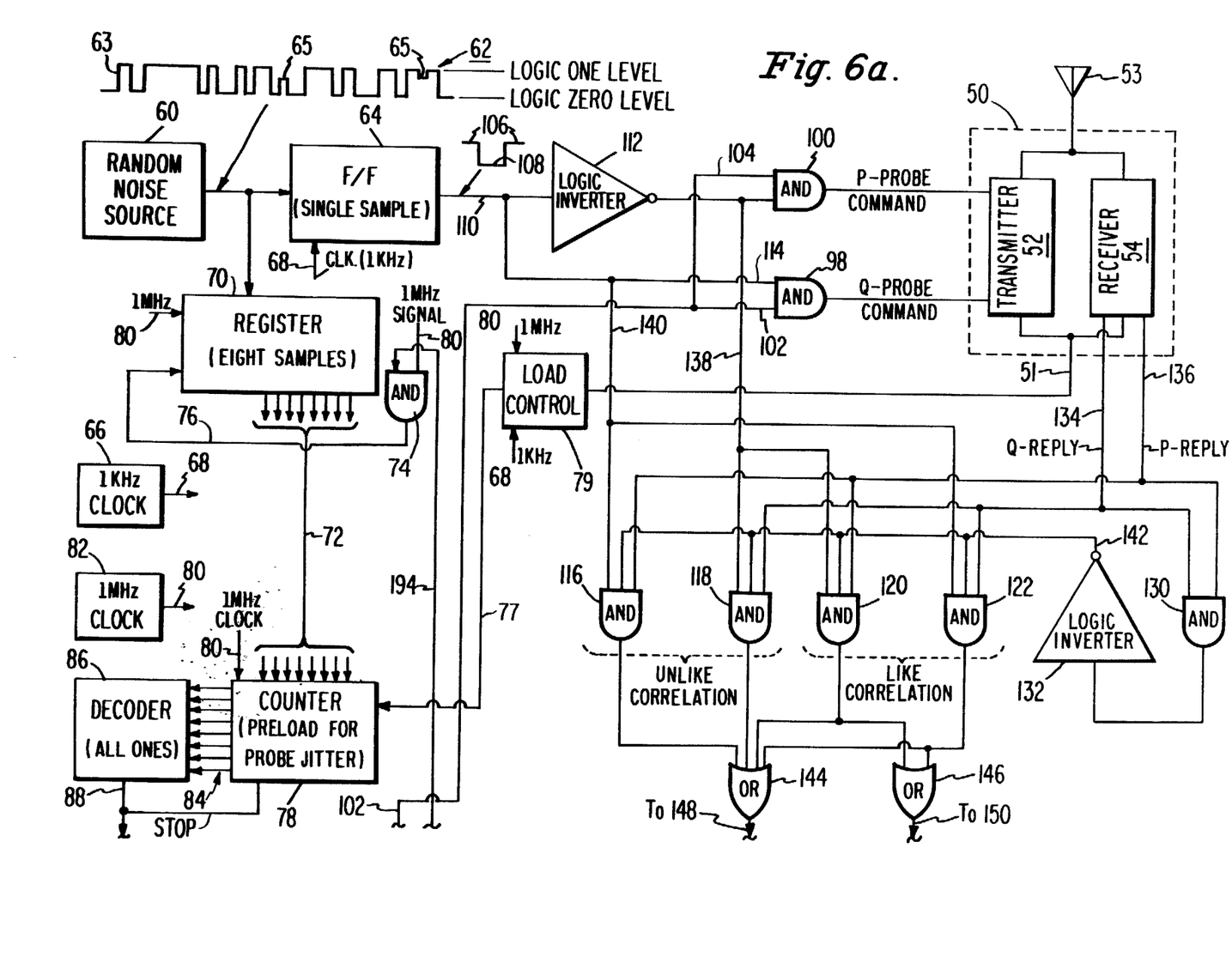
FIGS. 6a and 6b is a block diagram of the correlator and control system according to the invention.
Figure 6B:
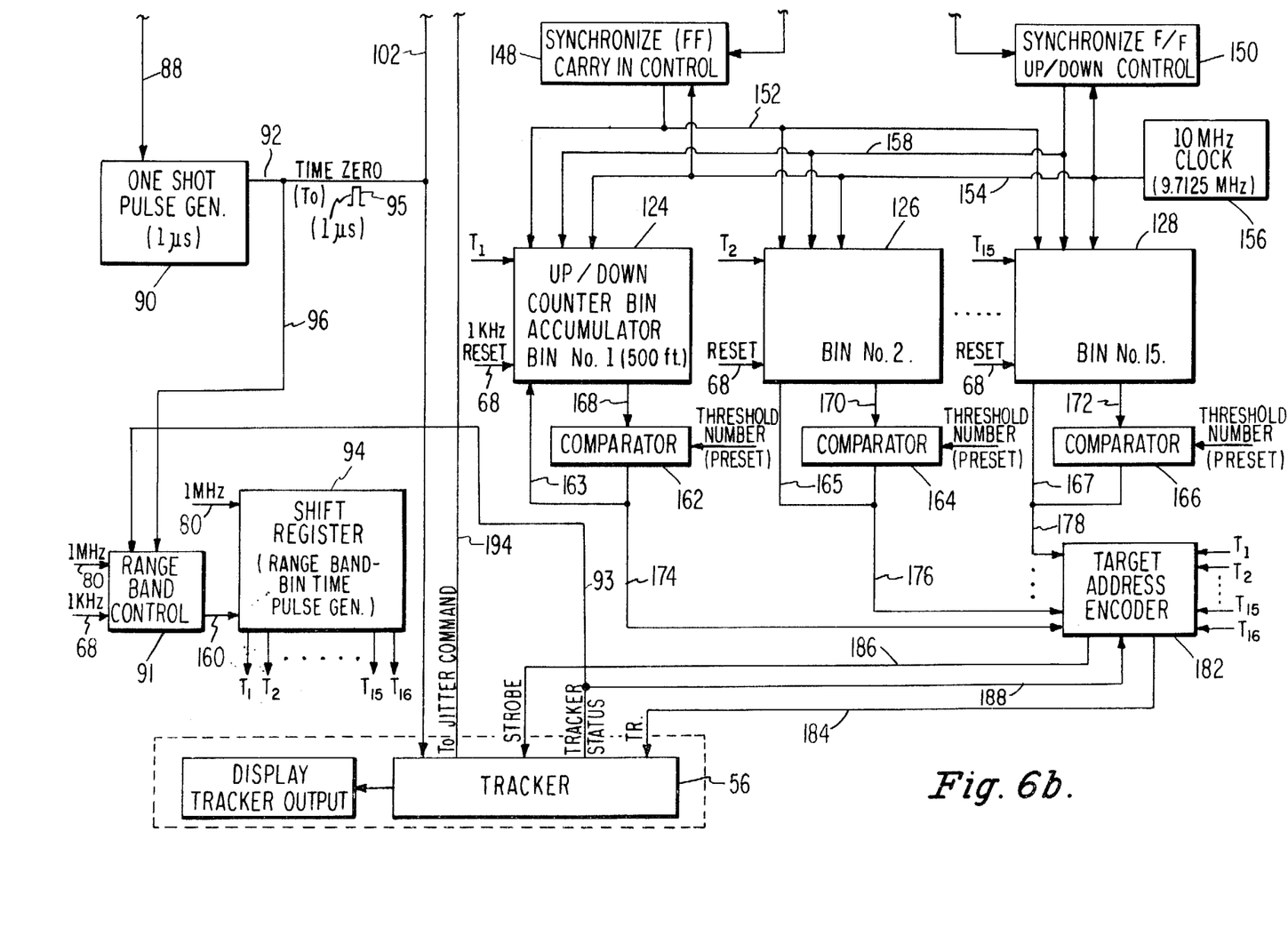

Referring now to FIG. 6, there is shown a block diagram of an embodiment of a correlator and control system according to the invention in its relation to a collision avoidance system including a transponder 50, comprising a transmitter 52, the transponding reply path 51, and receiver portion 54, associated antenna 53, and a suitable tracker 56. A suitable tracker is described in the above-identified copending patent application, Ser. No. 269,536, 3,803,604 entitled "Digital Tracker."

A random noise source 60 provides a train of logic level pulses of random spacing and substantially constant amplitude 65 as indicated by wave forms 62 which are applied to a flip-flop 64 which in turn is gated by a 1 kilohertz clock 66 over common 1 kHz clock bus lead 68. A suitable noise source is described in the above-identified copending application filed on even date herewith, entitled "Digital Interface Circuit for a Random Noise Generator," U.S. Pat. No. 3,816,765. The several clock sources shall be described as providing clocking pulses in approximate values such as 1 kilohertz (66) or 1 megahertz (82). However, in a preferred design for a SECANT system the clocking pulse rates are more precise, namely, 971.25 Hz for the 1 kHz clock (66) and 0.97125 MHz for the 1 MHz clock (82). The wave forms 62 are preferably of uniform amplitude as shown by pulses 63. However, due to transient time limitations of solid-state components, the amplitudes will vary on an occasionally random basis, such variations being indicated by pulses 65.

Random pulses 62 are also applied to register 70 suitably a conventional eight-bit register clocking over path 76 by a gated 1 megahertz clock and adapted to receive eight samples of random noise pulses 62. The gated clock path 76 is formed by AND gate 74 that allows the one MHz clock 80 to be on gated clock path 76 when a "jitter" command 194 from the tracker 56 is provided. "Jitter" is a technique known in the radar art whereby transmitted radio frequency (RF) pulses are jittered about a reference time interval to overcome the effect of "white noise." The jitter command as used in the SECANT system is generated in the tracker 56 as described in the above-identified application, Ser. No. 269,536 now U.S. Pat. No. 3,803,604. If jitter is not used, the register 70 is simply gated by the system 1 MHz clock 82.

After eight samples of random noise pulses 62 are stored in register 70, the corresponding eight output logic levels over paths 72 in turn produce the starting address for probe jitter counter 78. The starting addresses which are random logic levels over path 72 are loaded into counter 78 by a load signal on path 77 generated by a load control logic 79. The load signal over path 77 occurs once each millisecond as clocked by 1 kHz clock 68 and is a precondition to causing a P or Q probe to be transmitted. The load control logic 79 suitably formed of inhibit logic gates, monitors the transponder reply signal path 51 so that the counter 78 is inhibited during any period that the station aircraft is replying to a probe from remote aircraft. This control feature is achieved by providing suitable logic in the transponder 50 to provide an inhibit logic condition on path 51 to indicate the period during which the transponder 50 (preferably a suitable remitter in the SECANT system), is replying to a probe. During this period, a probe transmission would otherwise interfere with a reply to a probe.

Load control 79 is clocked by both the 1 kHz clock 68 and 1 MHz clock 80 to provide a control pulse in synchronism with the system probing cycle.

When inhibit path 51 is clear, load control 79 generates a load signal on path 77 to trigger counter 78. Counter 78, is suitably an eight bit counter such as two hexi-decimal counters of known type. The counter 78 is preloadable to cause probe jitter and is clocked over path 80 from a 1 MHz clock source 82. As counter 78 receives its starting address from register 70, it in effect functions as a counter and produces output pulses over the eight paths 84 to an eight input gate 86, suitably an AND, NAND, or NOR gate of suitable design, which responds to the output of counter 78 to accumulate eight samples. Gate 86 serving thus as a decoder develops a trigger pulse over path 88 to trigger one shot 90, suitably a monostable multivibrator arranged to provide a one microsecond pulse. The output of gate 86 over path 88 is also used to stop counter 78 from counting any further once the decoded condition is attained. Thus, no further output pulses from decoder 86 will occur on path 88 until counter 78 is again preloaded by load control logic 79. The output of one shot 90 is the reference signal of the system identified as $T_0$. $T_0$ is the starting pulse for each cycle of operation. The $T_0$ pulse 95 over bus 92 is applied to range band control 91 over path 96 and to each of two input AND gates 98 and 100 over paths 102 and 104, respectively.

Figure 7:
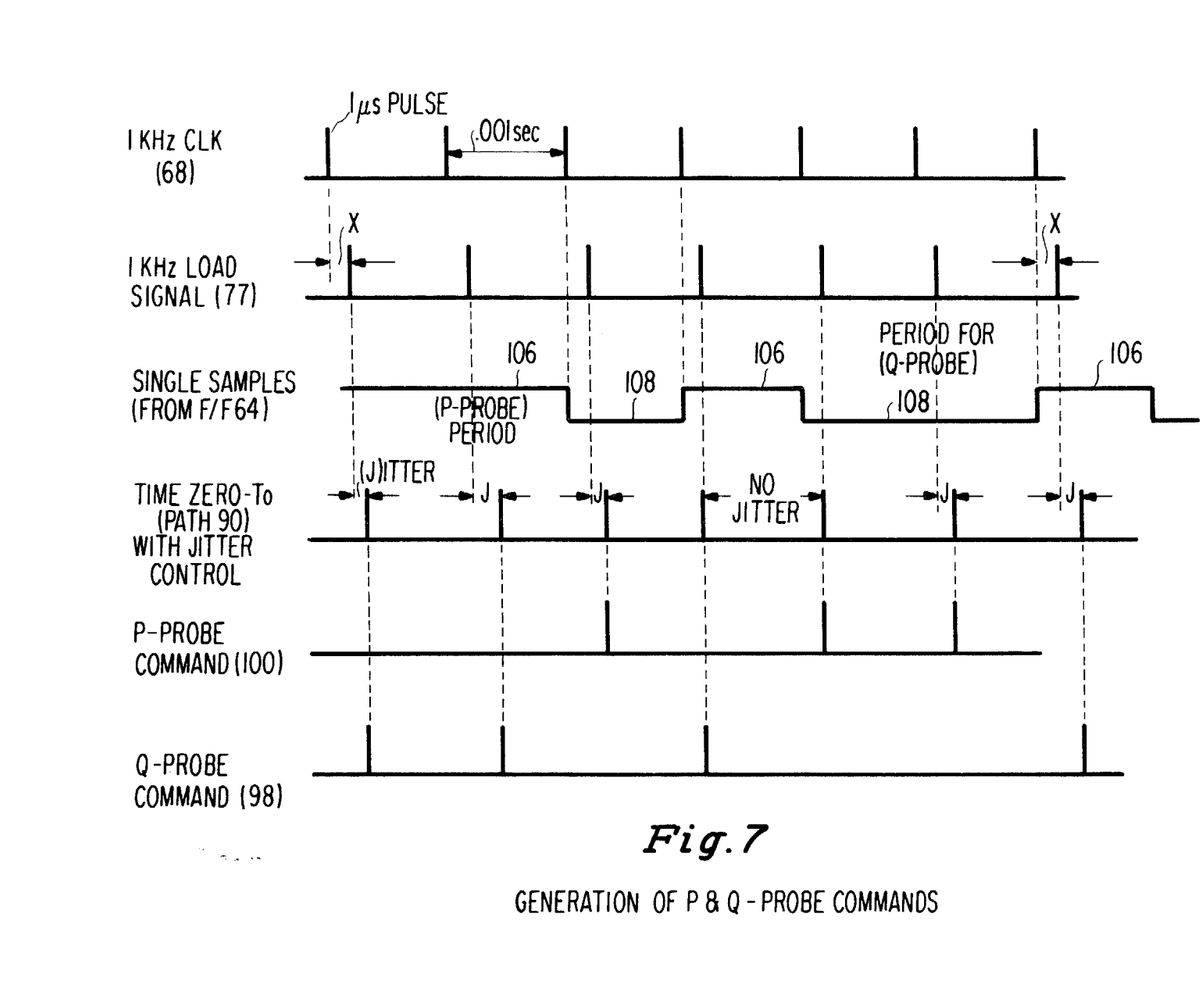
FIGS. 7, 8, and 9 are timing charts of signals illustrating the sequence of operation of the system.

The arrangement of the correlator portion so far described, generates a $T_0$ reference signal on an asynchronous random basis from noise source 60 (see FIG. 7). A single sample of a pulse from source 60 is used to determine whether a P type probe or a Q type probe will be transmitted by the transmitter 52 portion of remitter 50. In addition, eight samples of the random noise source 60 are used to determine the amount of jitter to be associated with the probe. Probe jitter as used in this description refers to the specific duration between probe occurrences. Nominally, one probe will be transmitted during each period of the one kilohertz clock 66. With no probe jitter, the spacing between probes will be one millisecond. With probe jitter, the spacing will range in a random manner preferably to any of the 500 0.001 millisecond increments between 0.750 milliseconds to 1.250 milliseconds. The jitter command signal over path 194 from tracker 56 causes the probes to be either jittered or not jittered. AND gate 74 as controlled by the signal over path 194 allows the register 70 to either update its samples or not, to in turn, cause a different or not different starting point for counter 78. The $T_0$ pulse generated by one shot 90 has a duration of about one microsecond, preferably 1.2 microseconds. Each $T_0$ pulse is spaced from a preceding $T_0$ pulse as described above and is under control of the tracker 56. According to a preferred form of SECANT, as explained in said copending application, Ser. No. 269,536, now U.S. Pat. No. 3,803,604 the tracker 56 is arranged to be operated to have a jitter for all acquisition and tracking operations except for the period of a "long track" represented by 678 $T_0$ probes. To assure that no jitter occurs during this long track period, so that no false targets are received owing to the jitter effect, the tracker system is arranged to inhibit the jitter circuit of the correlator. A probe of either a P or Q signal is thus transmitted, on the average, once each millisecond.

Since the output of random noise source 60 is a digital output signal represented by a continuous train of signals 62, statistically, as known in the art, such a source will develop pulses that will be at a relatively high logic level 50 percent of the time and a relatively low logic level 50 percent of the time. Thus, a sample of random noise source 60 when applied to flip-flop 64 will be registered in the flip-flop 64 during each one millisecond clock period as either a relatively high or relatively low logic level. The output of flip-flop 64 during each probe cycle thus will be either a high logic level 106 or a low logic level 108. The output path 110 carrying these logic levels is applied to a logic inverter 112 and the second input 114 of AND gate 98.

The eight jitter samples stored in register 70 are clocked as previously described by a one MHz clock 82. Decoder 86 in response to output signal of counter 78 develops reference signal $T_0$ by triggering a suitable one shot pulse generator 90. The $T_0$ signal over path 92 is combined with the probe type noise sample from flip-flop 64 to command the transmitter 52 for either a P or Q type probe frequency for transmission as interrogation probes. The P and Q probe commands are produced by either AND 100 or AND 98 depending upon the logic level of the signal from flip-flop 64. If a high logic level 106 is developed on path 110, logic inverter 112 develops a low logic level input to AND gate 100 so that no output can be passed by gate 100. Logic level 106 however applied to AND gate 98 together with the $T_0$ signal over path 92 developes an output from AND gate 98 commanding the transponder 50 to transmit a burst of RF signals at the frequency corresponding to the Q type probe for transmission over antenna 53. When a low logic level 108 is generated by flip-flop 64, inverter 112 generates a high logic level to enable AND gate 100 concurrently with the $T_0$ signal to develop a P probe command to transponder 50 for the transmission of P probe over antenna 53. The low logic level 108 it is noted, will not enable AND gate 98.

The transponder or remitter 50 is of known design suited to generate a plurality of signals in the range allocated for aircraft communications. Such transmitters are well known in the art and need not be described in detail for the present description.

The transmitted RF probes corresponding to the P and Q signals cause other aircraft receiving such probes in the vicinity to transmit corresponding replies as previously described for the illustration in FIG. 1. Four, three-input AND gates 116, 118, 120, and 122 are used to correlate replies received over antenna 53 and detected by receiver portion 54 of the remitter 50. For unique replies, that is, replies that are not coincident with other signals, the resulting correlation is either like or unlike (see FIGS. 2, 3, 4, and 5). Combinations of these two types of correlations are used to control a set of up/down counters that serve to integrate or accumulate the stream of correlations in varying degrees of density that will be made from a stream of replies, the density of which depending on the density of aircraft in the vicinity and range of the interrogating aircraft. The up/down counters 124, 126, and 128 function as will be described as bin accumulators.

The nonunique replies are those replies received that are coincident in some portions of their signal period with other replies. Such replies may cause ambiguous correlation if not processed properly. A two input AND gate 130 is used to detect all such overlapping or coincident replies portions. By this arrangement correlation of such replies is effectively inhibited during the overlap of either of the two types of replies that is otherwise unique or distinctive. Since one type of reply will give, for example, a like correlation while the other type of reply will give an unlike correlation, the presence of both types must give, as will be described, a cancelling effect. The inhibiting action effected by AND gate 130 and logic relation with logic inverter 132 achieves a cancellation without any additional control on bin accumulators 124, 136, etc. since each of the correlator AND gates require 3 inputs to effect a signal output.

Signals received in reply to interrogations from remote aircraft are applied to the array of AND gates over paths 134 and 136 as a respective input to each of the three input AND gates 116, 118, 120, and 122 as well as the two input AND gate 130. A second input of each of the AND gates is derived from either the P probe or Q probe channel over paths 138 and 140, respectively. The third input of each of the correlating AND gates is from the output of inverter 132, over path 142. Output signals of the correlator AND gates are applied to a pair of OR gates 144 and 146. The arrangement of the logic of the AND gates 116 and 118 provide correlation for unlike signals whereas the output of AND gates 120 and 122 provide correlation for like signals in a manner as typically indicated in FIGS. 4 and 5.

The like and unlike correlations are combined through OR gates 144 and 146 to suitable delay-type flip-flops 148 and 150. The output of OR gate 144 applied to flip-flop 148 serves to synchronize the carry and control signals required for up/down counters 124, 126, etc. over common control path 152. The output of OR gate 146 applied to flip-flop 150 serves to synchronize the up/down control required for the up/down counters over path 158. The 10 MHz clock 156 serves to trigger each of the two delay-type flip-flops 148 and 150, whose data inputs are respectively connected to the outputs of gates 144 and 146. This arrangement and resulting operation causes the asynchronized signals from gates 144 and 146 to be each quantized by the 10 MHz clock 156 so that the outputs from flip-flops 148 and 150 are each now synchronized to the timing systems of the correlator system.

Like correlations from gates 120 and 122 are synchronized to the correlation timing to control the direction in which the counters shall count. The logic is arranged to count up for like correlations from AND gates 120 or 122 and count down for an absence of a like correlation, that is, for unlike correlations. Conventional up/down counters operate to count up or down as well known in the art depending upon the present or absence of such a control signal as from flip-flop 150.

The array of up/down counters, termed here, bin accumulators or, simply, bins 124, 126, etc. are continuously clocked by 10 MHz clock signals over path 154 from source 156. Each bin is suitably formed of three, four-bit up/down counters. Such a combination provides for counts between 0 and 2,549 to be made. The numerical value of this count is utilized in the SECANT system to determine range in nautical miles as will be explained.

One form of a SECANT collision avoidance system is arranged to utilize 15 such bins to form the accumulator set. Each accumulator requires a carry-control, an up/down counter control, and a 10 MHz clock control. These input controls are provided by control paths 152 for the carry-in control, path 154 for the 10 MHz clock control and path 158 for the up/down control. In addition, a one microsecond reset pulse that occurs each 0.1 second is applied to the bins from the 1 kHz clock 66 over path 68, whereby each bin is cleared and reset to zero each 100 milliseconds.

Each bin is controlled and distinguished from another bin in the set by a group of bin time control pulses designated $T_1, T_2 ... T_{15}$. Each pulse is 1 microsecond in duration and controls the enable input to the appropriate bin. The bin time pulses are generated by the range band shift register 94 which is suitably formed of a conventional 16-bit shift register each cycle of which being under control of a range band control 91. Range band control 91 is formed of suitable logic circuits to provide a one microsecond signal every millisecond over path 160, to start each cycle of shift register 94. Shift register 94, serving as a control of bins 124, etc., completes a cycle and stops automatically when sixteen clock periods by clock 80 of 1 microsecond each have occurred. Shift register 94 provides (See FIG. 8) an output pulse at the end of each clock bit of approximately one microsecond in duration over 15 separate control paths $T_1$ to $T_{15}$ which are connected to the respective paths $T_1 - T_{15}$ of bins 124, 126, ... 128. Control paths $T_1$ to $T_{15}$ are also connected to a target address encoder 182 as well as an additional control signal over path $T_{16}$. The pulse sequence of the bin pulses is such that the end of the first pulse $T_1$ coincides with the start of the second pulse $T_2$, the end of pulse $T_2$ coincides with the start of pulse $T_3$, etc., through pulse $T_{15}$. Thus, a 15 microsecond band sweep of 15 pulses of one microsecond each controls the time for the correlation and accumulation of replies for 15 bins, each of which is related to a range from the interrogating aircraft. The present system is arranged so that a period of 15 microseconds of correlation time represents a target range band of replying aircraft of 1¼ nautical miles. Continuous operation of the correlation and accumulation processes involves evaluating all targets in each bin range band, through suitable tracking periods, such as described in the above-identified copending patent application of the "Digital Tracker," now U.S. Pat. No. 3,803,604 including means for stepping the range band further out in range as controlled by range band control 91 until the maximum desired range limit is reached. (See FIG. 8).

Range band control 91 uses the 1 MHz clock 82 over path 80 and the 1 kHz clock 66 over path 68, and is under control each cycle of pulse $T_0$ over path 96 and the tracker status signal path 93 from tracker 56. Range band control 91 in part functions as a first counter of conventional form that counts in increments of nautical miles which, as indicated above, corresponds to an increment of about 12 microseconds (more precisely, 12.36 microseconds). The 12 microseconds interval relates to the time that a radar type pulse (a probe for SECANT) takes to travel out 1 nautical mile to a target and then travel back 1 nautical mile as reflected by the target (as a transponder or remitter reply for SECANT). The selected count sequence for the present system is 0, 1, 2, 3, 4, 5, 6, 7, 8, 9 in a repeating type routine. This sequence is the stepping action for the bin range band. Each step represents at least one complete correlation interval of 100 successive $T_0$ pulses or 0.1 seconds. The 0.1 second duration occurs when no targets are identified by correlation from the bins 124, 126, etc, which thus determines minimum interval. The maximum interval occurs while targets are being correlated, the time for which being a direct function of the time necessary for the tracker 56 to track each of up to 15 possible targets detected by the respective 15 bins.

Operation of the range band control 91 is started each probe period by $T_0$ over path 96. The pulse $T_0$ resets to zero a suitable counter in the control 91 that counts in increments of 12 microseconds when clocked by 1 MHz clock (80). When the count is equivalent to the particular step of immediate interest in the range band stepping sequence, a start pulse is generated. This start pulse is first, used to stop the second counter whose action was started by pulse $T_0$ and second, sent over path 160 to shift register 94 to start thereby to generate the signals $T_1, T_2, ...T_{16}$. A third counter of suitable type in control 91 is used to count the number of $T_0$ pulses until 100 is reached. When a count of 100 is reached, absent a status signal from tracker 56 over path 93, the first counter of control 91 is incremented to the next step in the 0 to 9 count sequence. It is noted that the 0-step follows the 9-step. The tracker status signal over path 93 indicates that tracker 56 is requesting targets and therefore is not busy. In addition, the function (to be explained in detail later) of the target address encoder 182 is to "hand-off" to tracker 56, but only once per cycle, all targets correlated by the bins 124, 126, etc. Hence, when the tracker status over path 93 continues to indicate a not-busy condition the overall status condition indicates that a specific bin range band correlation-track cycle has been completed and that the operation of the system is to step to the next bin range band. It should be noted that a ¼ nautical mile overlap is provided in the range stepping procedure of the range band so that no targets should be missed or overlooked. This is accomplished automatically according to the arrangement of the present system since the stepping sequence is in increments of 12 microseconds each while the 15 bins represent 15 microseconds. Thus, bin No. 13, bin No. 14, and bin No. 15 coincides, in range, respectively, to bin No. 1, bin No. 2, and bin No. 3 of the next following range band step. The exception, it should be noted, is from step No. 9 (the 9th nautical mile) to step No. 0 (the zero nautical mile). The overlapping of 3 bins is thus, ¼ of a nautical mile. (See FIG. 9).

Bin accumulators 124, 126, and 128 (Nos. 1–25) are coupled to their respective digital comparators 162, 164, and 166 by paths 168, 170 and 172. Each of the comparators are formed suitably of logic gates such as a 12-bit digital comparator. The threshold number of each comparator is preset based on design criteria up to which each of the bin accumulator counts lock, as will be explained. If, at the end of each bin time pulse period the bins count to their preset threshold numbers, an output signal is developed over the respective output paths 174, 176, and 178 which is applied to the target address encoder 182. Simultaneously, the output developed over paths 163, 165, and 167 are each used with suitable gating in each respective up/down counter of bins 124, 126, and 128 to inhibit the counting action of the counter. Further counting cannot occur for such an inhibited counter until a 1 kHz reset signal over path 68 is applied to the counter bin. A bin so inhibited represents a correlated target destined to be tracked by the tracker 56.

The function of the target address encoder 182 is to monitor the correlated targets available and convert them into an address signal suitable for "hand-off" to the tracker 56. This signal is identified in the SECANT system as the $T_R$ pulse over path 184 to tracker 56, preferably a tracker of the form described in the above-identified "Digital Tracker" patent application now U.S. Pat. No. 3,803,604. The target address encoder 182 also assigns a priority to the correlated targets. The priority is such that the nearest target is "handed-off" first, the next nearest second, and so forth until all the targets have been handed-off for a given range band step. Once these "hand-offs" are achieved, the operation proceeds to the next range band step. A successful target address hand-off requires a $T_R$ pulse and a strobe pulse over path 186. However, the tracker status signal path 188 must indicate that the tracker is not-busy and, in addition, a target address $T_R$ is requested. As previously described, the correlated target identities are applied to the target address encoder 182 over paths 174, 176, and 178. The pulses $T_1, T_2, ...T_{15}$ are used by encoder 182 to generate the proper $T_R$ pulse and pulse $T_{16}$ is used to generate the strobe pulse over path 186 to the tracker.

Thus, according to the arrangement of this embodiment of a SECANT correlator, each up/down bin counter 124, 126, etc., is enabled over its respective bin timing pulse control from shift register 94 so that each counter is counting like correlations as well as unlike correlations of the P and Q replies corresponding to the range band or bin assigned to that particular bin.

The nature of the accumulator operation and the manner in which a target is detected will now be described. Since each of the bins 124, 126, etc., are reset each 0.1 second by the 1 kHz clock over clock path 68 and a probe (P or Q) is transmitted once each millisecond, 100 probes will occur between reset signals. It will be noted that since the 15 bin enable pulses ($T_1$, $T_2$, etc.) are each one microsecond in duration and a ten MHz clock 156 is used for clocking the bins, a count of 10 counts per enable pulse can occur for a potential total count of 1,000 between reset clock signals 68. In order to attain a count of 1,000 in a particular bin, it is required that the replies to a probe be centered or coincident with the specific enable time pulse of the bin during that probe period. Thus, the responding aircraft will be a distance from interrogating aircraft in range corresponding to the selected range of the chosen bins 124, 126, etc. In other words, since each bin is 1/12 of a nautical mile, a target aircraft at a one nautical mile range, will register an accumulation in bin No. 12 for the zero step setting of the range band control.

Although a potential count of 1,000 in each bin is possible, an actual count of 400 was chosen for the present embodiment as being all that is necessary to register a true target (i.e., a correlated target) in any one bin. A suitable feedback arrangement, such as over feedback lead 163, 165, 167, etc. is provided in the system to hold the count and thus the target range identity in any bin for the remainder of the 0.1 second reset interval once the 400 count threshold is obtained.

All bin counts that reach the 400 count value are targets or represent targets that in turn will be "handed-off" to a tracker to further evaluate the nature of the threat in a manner well known in the radar art or such as that disclosed in the above-identified copending "Digital Tracker" patent application Ser. No. 269,536 now U.S. Pat. No. 3,803,604. The target "hand-off" is done first by bin No. 1, then bin No. 2, etc., if a target is so-identified.

The exact threshold in each of the bin counters 124, 126, is actually a band of numbers between the counts 400 and 1,269. The most significant bit in each bin is used like a sign term to bar or inhibit all counts between 1,270 and 2,549 from qualifying or being designated as a target. Since a reset condition on each bin is a count of zero, an unlike correlation immediately presented to the counter will cause count down from typically zero, or to 2,549, or 2,548, or, to say, 2100 for a string of unlike correlations, etc. Without a satisfactory upper limit on such a threshold, false targets would appear from a very long string of unlike correlations whhich as termed earlier as "fruit." In other words, up/down counters with finite range can count to any given number by going forward through the "front door" or backwards through the "back door."

Although the preferred form of the invention utilized up/down counters for providing the bin accumulation function for the counters 124, 126, and 128, it will be understood that a simple up-counter may be utilized with suitable logic circuits for providing the integrating function comparing like and unlike correlation from signals of the OR circuit 144 and 146 as will be apparent to those skilled in the art.

It will be further appreciated that in conventional logic circuits in which counts are made of 0 and 1 pulses, clock controls are usually required to prevent errors of the count of such logic signals. According to the present invention such possible errors of logic counts are avoided by the arrangement of the bin accumulators 124, 126, and 128 and by synchronizing all controls to the counters.

Figure 8:
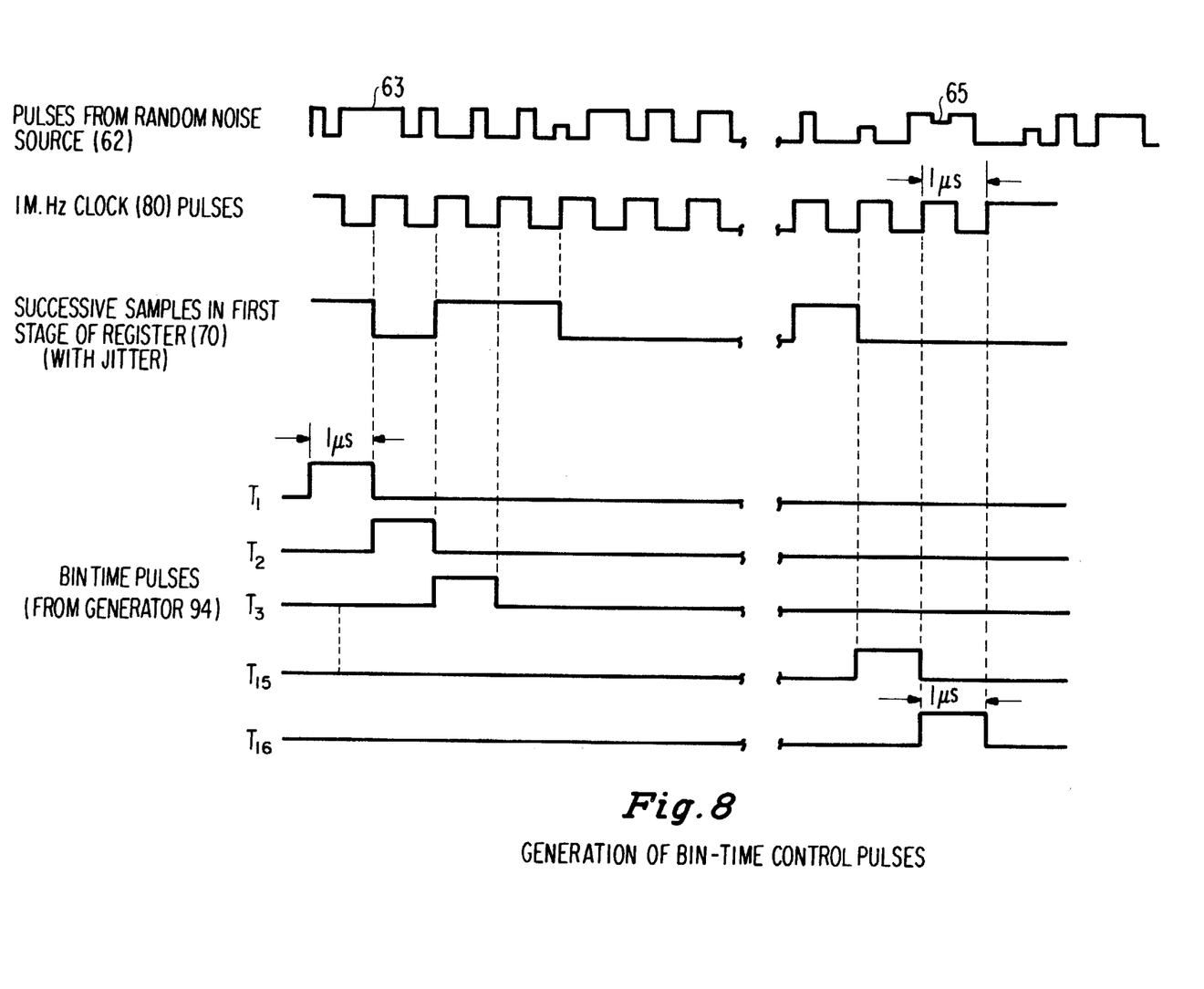
Figure 9:
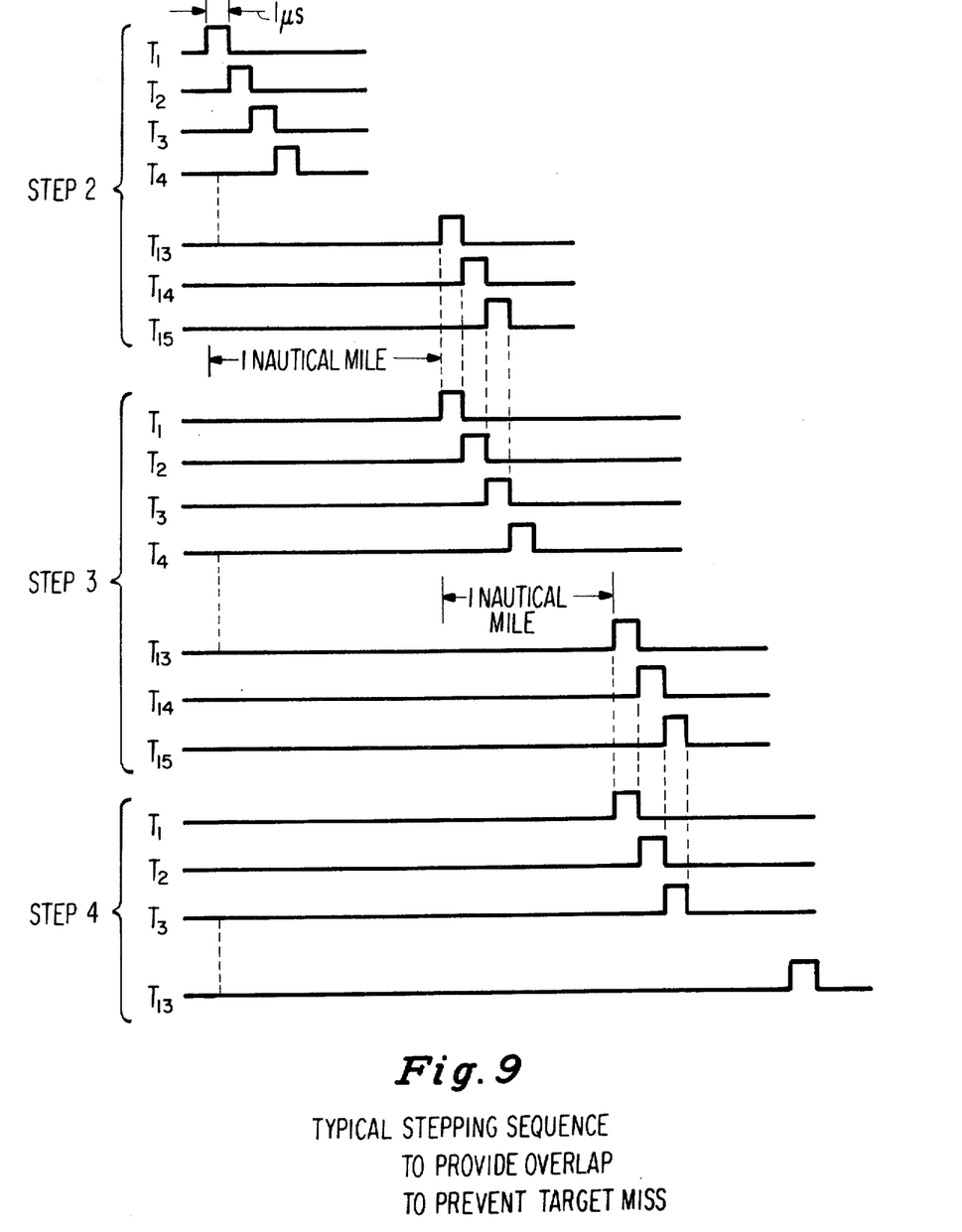

The timing charts of FIGS. 7–9 show the relation of the significant signals of the correlation and control system described above. A study of the timing chart in light of the above description will make the operation of the correlator and control system clear.

The timing charts illustrate the relative amplitudes and pulse widths of the various signals or pulses used or generated by the correlator and control system. Normally the signal or pulse has a constant, finite value indicated by the bottom-most horizontal straight line portion of each row of waveforms, as well known in the art.

In summary, sampled random noise pulses 62 are converted to P or Q probe commands (100 or 98) for interrogation of target aircraft, transmitted every millisecond under control of the time zero signal $T_0$ as shown in FIG. 7.

The bin time control pulses $T_1 - T_{16}$ are developed from the random pulses 62 processed through the register 70 whereby the control pulses are generated by shift register 94 as shown in FIG. 8. Jitter commands cause the register to shift in time the time zero pulse $T_0$ relative to the load signal 77 (FIG. 7).

The pattern of timing pulses $T_1$ through $T_{15}$ for a sequence of typical range band steps is shown in FIG. 9. The pattern of pulses indicated at Step 2 exists for 0.1 seconds following each $T_0$ time zero pulse or until the tracker 56 tracks all the correlated targets. The next step, step 3, shows the pattern of pulses which exists for the following 0.1 seconds following each $T_0$ time zero pulse or, again, until the tracker 56 tracks all correlated targets. The next step, step 4, shows the pattern for the next following 0.1 seconds following each $T_0$ pulse or until the tracker 56 has completed tracking all correlated targets. This sequential stepping is repeated throughout the operation of the correlator as previously described. It should be noted in the pattern of pulses that pulses $T_1$, $T_2$, and $T_3$ of step 3 correspond to pulses $T_{13}$, $T_{14}$, and $T_{15}$, respectively, of step 2. By this arrangement, an overlap of ¼ nautical miles is provided to assure thereby that no target be missed or overlooked.

The above description is based on 10 steps for processing replies from aircraft within 10 ¼ nautical miles, each step (see FIG. 9) representing one nautical mile. The range can be extended by providing additional steps and/or bin as required.

In the above description, the clock source 156 (10 MHz) is the reference and principal source of timing for the system, the 1 MHz clock (82) and the 1 kHz clock (66) deriving its reference timing pulses from the 100 MHz clock 156 in any suitable arrangement known in the art. In order to avoid a race in timing, the load control 1 kHz signal from load control 70 is suitably delayed a short interval, such as one millisecond as indicated by the delay interval - X shown in FIG. 7 on the "1 kHz load signal" time chart.

It will be appreciated that a source of pulses such as source 60 may generate P or Q type probe commands continuously and will not affect the operation of the system. Thus, the correlator still functions to distinguish threats from "fruit." Thus, it will be further appreciated, that although the embodiment of the correlator and control system described above is based on the use of two probe commands and replies, the system may be utilized in environments where fruit levels are low to identify threatening vessels or, indeed, identify a non-moving reference station by suitable modification. Thus, the system illustrated in FIG. 6 may provide for the use of only a single probe such as a P-probe whereby only AND gate 120 would be required to process corresponding P-replies. In such a system, such as for example, for marine vessels the remote moving vessel or fixed land station need only provide a transponder or remitter function, such as remitter 50 in FIG. 6, to return a P-reply signal on receipt of a P-probe transmitted from a moving vessel provided with a correlator of the invention.

It will be further appreciated that in such a modified system, no negative count accumulation would be required so that a simple up-counter for bins 124, etc. is needed.

It will be now appreciated that according to the invention, probe/reply signals that are random both in frequency (P or Q) and time (pulse $T_0$) are correlated by a double-correlation function in range so that threatening vehicles, more particularly, aircraft, can be identified even in very high density environments. The modification of correlating only on a time random basis provides for a means of identifying vehicles, especially, slower moving marine vessels, which usually operate in less dense environments whereby the level of "fruit" is much less than is experienced in aircraft environment.

What is claimed is:

1. A digital correlator comprising:
   a. a source of random digital signals of varying pulse width,
   b. means for periodically sampling said random signals to generate any one of two interrogation signals each having a distinguishing indicia from the other,
   b1. said interrogation signals adapted for transmission to the environment once each period for interrogating the presence of remote stations,
   b2. said remote stations having means responsive to said interrogation signals to generate and transmit to the environment a reply signal corresponding to the respective interrogation signals received by them,
   b3. said remote stations further having means for periodically transmitting any one of two interrogation signals, corresponding to said first mentioned interrogation signals, generated in response to a random source different from said first mentioned random source,
   c. means for receiving signals comprising said reply signals and interrogation signals from said remote stations,
   d. means for discriminating said received signals into signals corresponding to either one of said two interrogation signals,
   e. digital circuit means in synchronism with said periodic sampling means for comparing the transmitted and replied interrogation signals during each sampling period for providing any one of said two signals corresponding, respectively, to like and unlike correlations of the sampled and received signals, and
   f. digital circuit means responsive to said comparison means for integrating the like and unlike signals.

2. A correlator according to claim 1 wherein said integrating means includes means for sequentially integrating the signals from said comparison means according to the range to said remote stations.

3. A correlator according to claim 2 wherein said integrating means includes means for limiting the integration of like signals to a predetermined value manifesting the presence of a remote station in the environment.

4. A correlator according to claim 3 wherein said limiting means includes a logical comparator circuit having a preset logical number adapted to detect the integration of like signals greater than said preset logical number.

5. A correlator according to claim 4 wherein said comparator circuit includes means for generating a hold signal for locking said integrating means to the preset number when said integrator accumulates like signals corresponding to said preset number.

6. A correlator according to claim 1 including means for jittering said transmitted signals to shift in time the transmitted signal relative to a given period.

7. A correlator according to claim 6 wherein said jittering means includes:
   a. means for sampling a plurality of said random signals,
   b. a counter including means for preloading a count into said counter defining a starting count,
   c. means for counting said plurality of sampled random signals by said counter so that a predetermined decoded end count occurs in a random time interval from the preloaded start count,
   d. means for generating a pulse in response to said counter counting to a predetermined number of said plurality of sampled random signals, said pulse defining the periodic rate of comparing the transmitted and received signals.

8. A correlator according to claim 1 including means for providing a tracking signal to tracking means of a remote station identified by said correlator.

9. A digital correlator comprising:
   a. a source of random signals of substantially constant amplitude and randomly varying duration,
   b. means responsive to said signals for generating an interrogation signal for transmission on a random time basis to the environment for interrogating the presence of remote stations seeking thereby reply signals from said remote stations,
   b1. said interrogation signal generating means including means for shifting in time the transmission of said interrogation signal relative to a given period according to the variation of the duration of said source signals,
   c. said remote stations having means responsive to said interrogation signals to generate and transmit to the environment a reply signal corresponding to said interrogation signal received by said remote station, and having further means for generating and transmitting interrogation signals corresponding to said first mentioned interrogation signals,
   d. means for receiving reply signals and interrogation signals from remote stations,
   e. means for discriminating said received reply signals from received interrogation signals,
   f. digital circuit means in synchronism with said signal source of random signals for comparing during a given time period transmitted interrogation signals and received reply signals, and g. means for identifying the range of remote stations by the correlation of said received reply signals.

10. A correlator according to claim 9 wherein said time shifting means includes:
 a. means for sampling a plurality of said random signals of varying duration,
 b. a counter including means for preloading a count into said counter defining a starting count,
 c. means for counting said plurality of sampled random signals by said counter so that a predetermined decoded end count occurs in a random time interval from the preloaded start count,
 d. means for generating a pulse in response to said counter counting to a predetermined number of said plurality of sampled random signals, said pulse controlling the time of transmission of said first mentioned interrogation signal.

* * * * *